United States Patent
Kunishi et al.

(10) Patent No.: US 6,605,221 B2
(45) Date of Patent: Aug. 12, 2003

(54) METHOD AND APPARATUS FOR WASHING POLYCARBONATE/ORGANIC SOLVENT SOLUTION

(75) Inventors: Noriyuki Kunishi, Ichihara (JP);
Masayuki Takahashi, Ichihara (JP);
Tomoyuki Yoshida, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/926,721

(22) PCT Filed: Mar. 21, 2001

(86) PCT No.: PCT/JP01/02226
§ 371 (c)(1),
(2), (4) Date: Dec. 7, 2001

(87) PCT Pub. No.: WO01/77209
PCT Pub. Date: Oct. 18, 2001

(65) Prior Publication Data
US 2002/0175122 A1 Nov. 28, 2002

(51) Int. Cl.$^7$ .............................................. B01D 11/04
(52) U.S. Cl. ................... 210/634; 210/739; 210/101; 528/499
(58) Field of Search ................... 210/634, 644, 210/739, 772, 781, 789, 740, 101, 143; 528/491, 499, 502 R, 502 D

(56) References Cited

U.S. PATENT DOCUMENTS 4,316,009 A * 2/1982 Rinaldi et al. ............... 528/502
4,323,519 A * 4/1982 Mori et al. .................. 528/499
6,384,185 B1 * 5/2002 Inada et al. .................. 210/767
6,420,517 B1 * 7/2002 van Gool et al. ............. 528/502

FOREIGN PATENT DOCUMENTS

| JP | 5-186583 | 7/1993 |
| JP | 7-309940 | 11/1995 |
| JP | 9-40785 | 2/1997 |
| JP | 9-52949 | 2/1997 |
| JP | 9-104747 | 4/1997 |

* cited by examiner

*Primary Examiner*—Robert J. Popovics
(74) *Attorney, Agent, or Firm*—Oblon, Spivak, McClelland, Maier & Neustadt, P.C.

(57) ABSTRACT

Provided is a method for washing an impurities-containing polycarbonate/organic solvent solution with an aqueous washing solution, which comprises monitoring the viscosity of the mixture dispersion of the polycarbonate/organic solvent solution and the aqueous washing solution, and controlling the blend ratio of the aqueous washing solution in the system on the basis of the relation between the phase condition and the viscosity of the mixture dispersion. In the method of washing a polycarbonate/organic solvent solution with an aqueous washing solution, the amount of the washing solution to be used is reduced, and the mixture dispersion of the two solutions is stabilized at a high level of washing efficiency. The washing method is economical in practical use.

16 Claims, 2 Drawing Sheets

METHOD AND APPARATUS FOR WASHING POLYCARBONATE/ORGANIC SOLVENT SOLUTION

TECHNICAL FIELD

The present invention relates to a method for washing a polycarbonate/organic solvent solution, precisely to a method for efficiently washing a polycarbonate/organic solvent solution included impurities after polymerization to purify it with an aqueous washing solution in a process of producing polycarbonate through interfacial polymerization (with phosgene), and to an apparatus for washing it.

BACKGROUND ART

As having good mechanical properties including impact resistance, and having good heat resistance and high transparency, polycarbonates are used in various fields of electric and electronic appliances, machine parts, automobile parts, disk plates for information-recording media such as optical memory discs, etc. In general, polycarbonates are produced through interfacial polymerization (in solvent) of an aromatic dihydroxy compound such as bisphenol A with phosgene.

For producing them, also known is a method of melt polycondensation of diphenyl carbonate with an aromatic dihydroxy compound such as bisphenol A. However, the melt polycondensation method is not always satisfactory, since the reaction temperature for it is high and the reaction time is long, and since the impurities such as the catalyst residue in the polymers produced therein often have negative influences on the hue, the heat resistance, the steam resistance and the weather resistance of the polymers produced. For these reasons, therefore, interfacial polymerization is generally used for practical production of polycarbonates in view of the quality of the polymers produced.

In the process of producing polycarbonates through interfacial polymerization, the impurities that are side-reaction product as a result of the polymerization reaction, and other impurities, especially inorganic salts such as alkali halides, alkali hydroxides, alkali carbonates and their ions, as well as non-reacted bisphenol A, monophenolic compounds used as a molecular weight-controlling agent, amines used as a catalyst and others remain in the polymers produced. Even though a little, such impurities will lower the tinting strength, the heat stability, the steam resistance and the craze resistance of the polycarbonates.

To remove these impurities from them, the polymer solution is washed and purified in an apparatus equipped with a stirring tank, a multi-stage extraction column, an orifice column, a line mixer or the like, in which is used an aqueous washing solution. The washing method for the polymers may be grouped into two, a batch system and a continuous system. In any of these washing systems, however, the efficiency of washing a polycarbonate/organic solvent solution is low when the viscosity of the solution is high, and, as a result, the impurities could not be efficiently removed from the solution and it is difficult to increase the purity of the solution.

Accordingly, for example, proposed is a method of using a two-stage stirring tank, in which a polymer solution is first washed while it is in the form of a water-in-oil dispersed phase, then this is transformed into an oil-in-water dispersed phase easy of phase separation, and thereafter it is led into a static separation tank (Japanese Patent Publication No. 38967/1984). Also proposed is a method of first processing a polymer solution in an orifice column to have a high pressure loss, and thereafter leading it into a large-size static separation tank (Japanese Patent Publication No. 37032/1982). However, these washing methods require such large-size units, complicated operations and a long washing time, and therefore the productivity in the methods is low. In addition, the washing efficiency in the methods is not always satisfactory.

To solve the problems, some other washing methods for polycarbonate/organic solvent solutions are proposed. For example, <1> Japanese Patent Publication No. 53793/1994 discloses a method that comprises mixing a crude polycarbonate/organic solvent solution and an aqueous washing solution into a mixture having an aqueous phase content of from 5 to 30% by volume, then stirring the mixture in a line mixer being driven at a power of at least 0.1 kW/m$^3$/hr for the unit flow rate of the mixture to thereby form a water-in-oil dispersed phase, and thereafter centrifuging the resulting mixture. Japanese Patent Publication No. 39523/1994 also discloses a method that comprises mixing a polycarbonate/organic solvent solution and an aqueous washing solution to form a water-in-oil dispersed phase, then processing it to thereby make the liquid drops in the dispersed phase have a particle size of at most 100 μm, and thereafter centrifuging the resulting mixture having the thus-controlled dispersed phase.

<2> Japanese Patent Laid-Open No. 309940/1995 also discloses a method for washing an impurities-containing polycarbonate solution with an aqueous washing solution, in which the polycarbonate solution is first mixed with the aqueous washing solution in a mixer to form an oil-in-water emulsion mixture, and thereafter the resulting mixture is filtered through a filter layer to thereby separate it into a phase of the polycarbonate solution and a phase of the aqueous washing solution.

In the former <1> of these improved washing methods, a water-in-oil dispersed phase is formed in the step of mixing a polycarbonate/organic solvent solution with an aqueous washing solution; while in the latter <2>, an oil-in-water dispersed phase is formed in that step. In this point, <1> and <2> quite differ from each other. It is believed that these washing methods are both good.

However, the latter method <2> of forming the oil-in-water dispersed phase requires a large amount of the aqueous washing solution relative to the polycarbonate solution. Concretely, they say that the amount of the aqueous washing solution they need is from 0.7 to 5 times by volume of the polycarbonate solution, and actually in the Examples demonstrated by them, it is from 1.2 to 1.5 times by volume. Therefore, in the method, the volume of the mixture is large, and the method requires large-size and high-performance units for mixing the solutions and for separating the resulting mixture. In addition, the amount of the wash waste in the method greatly increases. The waste water contains the solvent for polycarbonates, which is most typically dichloromethane. The cost for recovering the solvent is high, and this will be a serious problem with the method.

On the other hand, the former method <1> of forming the water-in-oil dispersed phase is characterized in that the amount of the aqueous washing solution needed therein may be extremely small, as compared with that needed in the washing method <2>. Concretely, the amount of the aqueous washing solution in <1> may be from 5 to 30% by volume of the polycarbonate/organic solvent solution, and, in fact, it is from 10 to 25% by volume as in the Examples demonstrated by the inventors of the method <1>.

Accordingly, in the methods of washing polycarbonate/organic solvent solutions, any of the polycarbonate solution and the washing solution may form a dispersed phase, depending on the condition of the dispersion (emulsion) of the mixture of the two solutions, for washing the polycarbonate solution. In these methods, however, when the mixture forms an oil-in-water phase and when the amount of the aqueous washing solution is small, the efficiency of washing the polymer solution lowers to a great extent. Therefore, as in the method <2>, the phase ratio of the aqueous washing solution in the mixture having an oil-in-water phase must be high. Needless-to-say, also in the water-in-oil dispersed phase in the method <1>, the phase ratio of the aqueous washing solution may be high for attaining higher washing efficiency.

However, the emulsion condition of the mixture dispersion composed of a polycarbonate/organic solvent solution and an aqueous washing solution is significantly influenced by the change of the properties of the two solutions that constitute the mixture dispersion. Specifically, the properties of the polycarbonate/organic solvent solution that vary depending on the terminal structure of the polycarbonate, the molecular weight thereof, the viscosity of the polymer solution, the change of the resin concentration in the solution and the impurity content of the polymer solution, and also the properties of the aqueous washing solution that vary depending on the pH of the solution and the impurity content thereof have significant influences on the formation of the dispersed phase of the mixture dispersion of the two solutions.

Accordingly, even though the ratio of the aqueous washing solution to be fed to the polycarbonate/organic solvent solution is controlled to be all the time constant, the condition of the dispersed phase of the mixture of the two solutions could not be kept all the time constant, and it involves a problem of phase transition between a water-in-oil dispersed phase and an oil-in-water dispersed phase. In fact, therefore, the blend ratio of the aqueous washing solution in the mixture dispersion must be relatively lowered, or that is, the washing condition to be actually employed inevitably sacrifices a part of the washing efficiency for keeping the water-in-oil dispersed phase of good washability.

The present invention is to provide an economical method of washing a polycarbonate/organic solvent solution with an aqueous washing solution, in which the amount of the aqueous washing solution to be used can be reduced while stabilizing the washing efficiency at a high level, in particular, to provide such a washing method for a polycarbonate/organic solvent solution capable of being effected even in a small-size apparatus and in a continuous process line, and to provide a washing apparatus for the method.

DISCLOSURE OF THE INVENTION

We, the present inventors have assiduously investigated the above-mentioned problems with the washing method for polycarbonate/organic solvent solutions, and, as a result, have found that the dispersion (emulsion) condition and also the phase transition of the mixture of a polycarbonate solution and an aqueous washing solution have significant influences on the washability of the polycarbonate solution, and that the phase transition of the mixture dispersion is accompanied by the viscosity change thereof. In addition, we have further found that, when the blend ratio of the aqueous washing solution in the mixture is suitably controlled based on the viscosity change of the mixture, then the polymer solution can be washed stably and its washing efficiency can be kept at a high level. On the basis of these findings, we have completed the present invention.

Specifically, the invention provides the following:

1. A method for washing an impurities-containing polycarbonate/organic solvent solution with an aqueous washing solution, which comprises mixing and dispersing the polycarbonate/aqueous solution with an aqueous washing solution, monitoring the viscosity of the resulting mixture dispersion, confirming the phase condition of the mixture dispersion from the viscosity change thereof, and controlling the blend ratio of the aqueous dispersion solution to the polycarbonate/organic solvent solution on the basis of the relation between the phase condition and the viscosity of the mixture dispersion of the two solutions.

2. The method for washing the polycarbonate/organic solvent solution of above 1, wherein the phase condition of the mixture dispersion of the polycarbonate/organic solvent solution and the aqueous washing solution is so controlled that the mixture dispersion forms essentially a water-in-oil dispersed phase.

3. The method for washing the polycarbonate/organic solvent solution of above 1, wherein the blend ratio of the aqueous washing solution to the polycarbonate/organic solvent solution is automatically controlled.

3. The method for washing the polycarbonate/organic solvent solution of above 1, wherein the polycarbonate content of the impurities-containing polycarbonate/organic solvent solution falls between 5 and 30% by weight, and the aqueous phase fraction of the mixture dispersion of the polycarbonate/organic solvent solution and the aqueous washing solution falls between 10 and 40% by volume.

4. The method for washing the polycarbonate/organic solvent solution of above 1, wherein the viscosity of the mixture dispersion of the polycarbonate/organic solvent solution and the aqueous washing solution is monitored with an oscillational viscometer.

5. The method for washing the polycarbonate/organic solvent solution of above 1, wherein the mixture dispersion of the polycarbonate/organic solvent solution and the aqueous washing solution is formed in a line mixer.

6. The method for washing the polycarbonate/organic solvent solution of above 5, wherein the stirring power in the line mixer is at least 0.1 kW/m$^3$/hr for the unit flow rate therein.

7. The method for washing the polycarbonate/organic solvent solution of above 1, wherein a purified polycarbonate/organic solvent solution is separated from the mixture dispersion of the polycarbonate/organic solvent solution and the aqueous washing solution mixed in the controlled blend ratio.

8. An apparatus for washing the polycarbonate/organic solvent solution, which comprises a unit for mixing and dispersing an impurities-containing polycarbonate/organic solvent solution and an aqueous washing solution, a unit for monitoring the viscosity of the resulting mixture dispersion, a unit for confirming the phase condition of the mixture dispersion from the thus-monitored viscosity change of the mixture dispersion, and controlling the blend ratio of the two solutions on the basis of the thus-confirmed phase condition, and a unit for separating a purified polycarbonate/organic solvent solution from the mixture dispersion.

9. The apparatus for washing the polycarbonate/organic solvent solution of above 8, wherein the unit for monitoring the viscosity of the mixture dispersion is an oscillational viscometer.

10. The apparatus for washing the polycarbonate/organic solvent solution of above 8, wherein the unit for mixing and dispersing the impurities-containing polycarbonate/organic solvent solution and the aqueous washing solution is a line mixer, and the unit for separating the purified polycarbonate/organic solvent solution from the mixture dispersion is a centrifugal separator.

Figure 1:
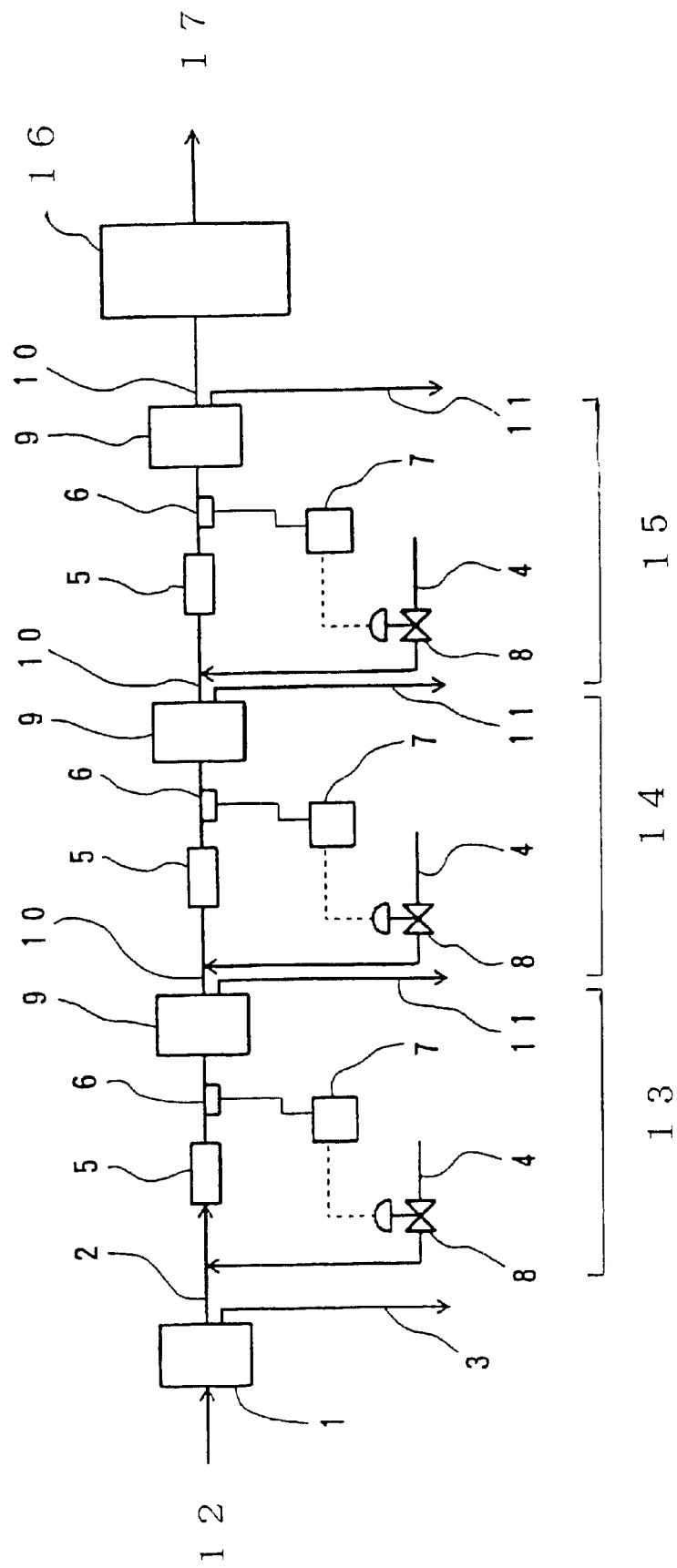
FIG. 1 is a schematic view of a continuous washing method, illustrating one example of the method and apparatus for washing a polycarbonate/organic solvent solution of the invention.

The reference numerals in these drawings are as follows:
1: Centrifugal separator
2: Polycarbonate solution
3: Waste water
4: Aqueous washing solution
5: Line mixer
6: Viscometer
7: Controller
8: Valve for controlling the flow of aqueous washing solution
9: Centrifugal separator
10: Purified polycarbonate solution
11: Waste water
12: Polymerization step
13: Alkali washing step
14: Acid washing step
15: Pure water washing step
16: Polymer recovery step
17: Final product
18: Aqueous phase ratio
19: Time

BEST MODES OF CARRYING OUT THE INVENTION

The invention is described in detail hereinafter.

The polycarbonate/organic solvent solution which is washed according to the method of the invention (this is hereinafter referred to as polycarbonate solution) is an impurities-containing crude polycarbonate solution that is separated from a polycarbonate-containing reaction mixture produced in a method of interfacial polymerization or solution polymerization for producing polycarbonate, especially in a method of interfacial polymerization for producing polycarbonate in the presence of a solvent capable of dissolving polycarbonate, by removing the aqueous phase from the reaction mixture.

The impurities include those having been side-produced as a result of the polymerization reaction, and other impurities, especially inorganic salts such as alkali halides, alkali hydroxides, alkali carbonates and their ions, as well as non-reacted bisphenol A, monophenolic compounds used as a molecular weight-controlling agent, amines used as a catalyst and others, as so mentioned hereinabove. The washing method of the invention may also be applied to polycarbonate solutions having been pre-washed in any other methods, as well as to roughly-purified polycarbonate solutions having been washed according to the method of the invention.

The interfacial polymerization may be any ordinary one, for example, for reacting an aqueous alkali solution of a dihydroxy compound with phosgene in the presence of an organic solvent to polymerize the monomers. In this, various types of dihydroxy compounds are usable, including, for example, bis(hydroxyphenyl)alkanes such as 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, etc., as well as 4,4'-dihydroxydiphenyls, bis(4-hydroxyphenyl) cycloalkanes, bis(4-hydroxyphenyl) oxides, bis(4-hydroxyphenyl) sulfides, bis(4-hydroxyphenyl) sulfones, bis (4-hydroxyphenyl) sulfoxides, bis(4-hydroxyphenyl) ethers, bis(4-hydroxyphenyl) ketones, hydroquinones, resorcin, catechols, etc. One or more of these diphenols may be used either singly or as combined. Of the diphenols, especially preferred are bis(hydroxyphenyl)alkanes, and more preferred are those consisting essentially of bisphenol A.

The organic solvent to be used in the reaction includes aliphatic chlorohydrocarbons such as dichloromethane, dichloroethane, trichloroethane, tetrachloroethane, pentachloroethane, hexachloroethane, dichloroethylene, etc.; aromatic chlorohydrocarbons such as chlorobenzene, dichlorobenzene, etc.; and their mixtures. Also usable are mixtures of such chlorohydrocarbons with other organic solvents such as dioxane, tetrahydrofuran, acetophenone, etc. Aromatic hydrocarbons such as toluene, xylene, ethylbenzene, and others, as well as aliphatic hydrocarbons such as hexane, heptane, cyclohexane and others may be added to such chlorohydrocarbons or their mixtures, and the resulting mixed solvents are also usable in the reaction.

Above all, especially preferred is dichloromethane (methylene chloride). The polycarbonate content of the polycarbonate/organic solvent solution to be processed herein generally falls between 5 and 30% by weight, but preferably between 6 and 25% by weight, more preferably between 7 and 20% by weight. If the polycarbonate content is smaller than 5% by weight, the amount of the polycarbonate solvent to be in the polymer solution shall be large, and therefore the amount of the aqueous washing solution to be used for washing the polymer solution shall be large. As a result, the amount of the mixture dispersion of the polymer solution and the washing solution increases, therefore requiring a large-size washing apparatus, and it is unfavorable. In addition, in the process of flaking the washed and purified polycarbonate, the large amount of the solvent must be evaporated away, and it is often disadvantageous in point of the economical aspect of the process. If, on the other hand, the polycarbonate content of the polymer solution is larger than 30% by weight, the viscosity of the solution will greatly increase, though depending on the molecular weight of the polycarbonate in the solution. If so, it is often difficult to uniformly wash the polymer solution. Accordingly, the polycarbonate content of the polymer solution is suitably controlled by diluting the solution with dichloromethane, depending on the molecular weight of the polycarbonate in the solution, the viscosity of the polymer solution and the washability thereof.

The aqueous washing solution to be used herein is an aqueous alkali solution such as an aqueous sodium hydroxide solution or the like, in case where it is for removing non-reacted dihydroxy compounds and monophenols. On the other hand, in case where the washing solution is for removing catalysts and alkali hydroxides, it is preferably an aqueous diluted acid solution, such as an aqueous diluted hydrochloric acid solution, an aqueous diluted phosphoric acid solution, etc. For removing alkali halides such as sodium chloride and others still remaining in the washed polymer solution, used is water, preferably high-purity water such as ion-exchanged water, distilled water, etc. The method of washing the polycarbonate/organic solvent solution that contains impurities such as those mentioned above generally comprises the alkali-washing step, the acid-washing step and the pure water-washing step each once, but if desired, repeatedly several times in that order.

In the invention, an impurities-containing polycarbonate/organic solvent solution is first mixed with an aqueous washing solution. In this step, the amount of the aqueous washing solution to be used is not the same in every case but is appropriately determined depending on the polycarbonate content of the polycarbonate/organic solvent solution, the type and the molecular weight of the polycarbonate, the type of the aqueous washing solution, the form, the type, the function and the size of the washing apparatus, etc. However, in the washing method of the invention, the amount of the washing aqueous solution may fall between 5 and 50% by volume, preferably between 10 and 40% by volume, more preferably between 15 and 30% by volume, relative to the total amount, 100% by volume, of the polycarbonate/organic solvent solution and the aqueous washing solution.

When the amount of the aqueous washing solution is smaller than 5% by volume, a water-in-oil dispersed phase of good washability can be formed, but the washing solution will be ineffective as its amount is too small, and, as a result, the object of the invention will be difficult to attain. On the other hand, if the amount of the aqueous washing solution is larger than 50% by volume, it will form an oil-in-water dispersed phase of low washability. If so, the effect of the washing solution greatly lowers, and, as a result, the object of the invention will be also difficult to attain. In the invention, the blend ratio in the mixture of the polymer solution and the washing solution in the washing step is not all the time constant. If desired, the flow rate of each solution to be fed into the system may be continuously or stepwise varied and controlled. In particular, the flow rate of the aqueous washing solution may be varied to thereby change the blend ratio in the mixture of the two solutions, or that is, the phase ratio of the mixture may be thereby changed.

For the washing method of the invention for a polycarbonate/organic solvent solution, various types of washing equipment maybe used. For example, the unit for mixing the two solutions may be built in the apparatus of producing polycarbonate, and it is not specifically defined so far as the two solutions fed thereinto can be well mixed and dispersed therein. The mixing unit may be a batchwise or continuous mixing unit equipped with a stirring blade, but preferred is a continuous mixing unit.

The continuous mixing unit includes a stirring tank equipped with a homogenizer or stirring, blade, a stationary mixer (static mixer, orifice mixer), a forcedly-stirring line mixer, and their combinations. The homogenizer is for forcedly passing a mixed solution through narrow slits to form a mixture dispersion of the solution. The stirring blades include a paddle blade, a propeller blade, a turbine blade, etc.

The stationary mixer does not have a mobile member for mixing liquids, but elements for liquid division are aligned in series or in parallel in several stages therein. This is for forming a fine mixture dispersion of different liquids within a short residence time therein. The forcedly-stirring line mixer is equipped with any of the above-mentioned homogenizer, stirring blade or turbine blade that is built in its line.

In the invention, preferred is a line mixer, as it is small-sized and requires a short residence time and as it enables high-speed agitation. The line mixer includes the above-mentioned stationary mixer and forcedly-stirring line mixer. For the invention, selected is a line mixer of a type in which even a mixture containing a relatively small amount of an aqueous washing solution can be well processed into a dispersion of fine droplets.

Accordingly, in the invention, the two solutions must be strongly stirred and mixed. For this, when the above-mentioned stationary line mixer is used, the pressure difference therein must be high, for example, falling between 0.5 and 3 MPa or so. Concretely, the number of the elements in the stationary mixer must be large, and the speed of the solutions that pass through each element must be high. For this, the power for passing the solutions under pressure through each element shall be high, but it is uneconomical as the equipment costs and the running costs will increase. Examples of the stationary mixer are static mixers and orifice mixers, such as Noritake Static Mixer (from Noritake Company), Sulzer Mixer (from Sumitomo Heavy Industries), Hi-mixer (from Toray), etc.

For the reasons mentioned hereinbefore, a forcedly-stirring line mixer equipped with a turbine blade or the like is preferred for the washing method of the invention. Examples of the line mixer are T.K. Pipeline Homomixer and T.K. Homomix Line Flow (both from Tokushu Kika Kogyo), Multiline Mixer (from Satake Chemical Machinery), Komatsu Throughser Disintegrator (from Komatsu Zenoah), etc.

According to the washing method of the invention, an impurities-containing polycarbonate/organic solvent solution and an aqueous washing solution are fed into the above-mentioned, mixing and dispersing unit, in which the two solutions are mixed and dispersed to form a mixture dispersion and the polymer solution is thus washed with the washing solution. The blend ratio of the polycarbonate/organic solvent solution to the aqueous washing solution is not specifically defined, but in general, the ratio of the aqueous phase (aqueous washing solution) in the mixture dispersion of the two solutions falls between 5 and 50% by volume, but preferably between 10 and 40% by volume, more preferably between 15 and 30% by volume. While the polycarbonate/organic solvent solution is washed with the aqueous washing solution of which the aqueous phase ratio falls within the defined range as above, the mixture dispersion of the two solutions may have any phase condition of a water-in-oil dispersed phase or an oil-in-water dispersed phase, depending on the various factors of the two solutions as so mentioned hereinbefore. Specifically, the washing method of the invention is characterized in that the mixture dispersion of the two solutions formed therein readily undergoes the mutual phase transition, depending on the varying properties of the two solutions, even though the aqueous phase ratio in the mixture dispersion is kept constant.

Regarding the dispersed condition, it is known that the water-in-oil dispersed phase (W/O) ensures better extraction of impurities from the polycarbonate/organic solvent solution than the oil-in-water dispersed phase (O/W). Accordingly, it is desirable that the polymer solution is washed while it is in the (W/O) dispersed phase. Naturally in the (W/O) dispersed phase, the washing efficiency is higher when the ratio of the aqueous washing solution is higher, or that is, when the aqueous phase ratio is higher. However, if the aqueous phase ratio is too high, it involves a serious problem in that the (W/O) dispersed phase of the mixture dispersion is transformed into an (O/W) dispersed phase thereof through phase transition therebetween, or that is, the phase condition of the mixture dispersion is changed to that of low washing efficiency. Accordingly, it is a matter of importance that the ratio of the aqueous washing solution in the mixture dispersion is increased under the condition under which the mixture dispersion keeps the (W/O) dispersed phase.

Having been thus mixed together, the polycarbonate/organic solvent solution and the aqueous washing solution is fed into the mixing and dispersing unit, in which they form a dispersion and the polymer solution is thus washed with the washing solution. In this stage, the mixture dispersion forms the intended (W/O) dispersed phase, and it is desirable that the particle size of the liquid drops in the dispersed phase is reduced to thereby increase the contact interfacial area for ensuring higher washing efficiency. For this, therefore, the size of the liquid drops in the dispersion is preferably at most 200 $\mu$m, more preferably at most 100 $\mu$m, even more preferably at most 50 $\mu$m.

For attaining the size of the liquid drops that falls within the preferred range, the above-mentioned stationary mixer of high mixing and dispersing efficiency may be selected. For this, however, the above-mentioned, forcedly-stirring line mixer may also be used for mixing and dispersing the two solutions. Preferably, the stirring power to be applied to the line mixer is at least 0.2 kW/m$^3$/hr for the unit flow rate, more preferably at least 0.5 kW/m$^3$/hr. In this condition, the intended object can be attained. For ensuring the preferred mixing and dispersing condition, preferably used is the forcedly-stirring line mixer as it may be small-sized, it requires a short residence time therein, and it enables high-speed revolution.

The method of the invention for washing an impurities-containing polycarbonate/organic solvent solution with an aqueous washing solution is characterized in that the viscosity of the mixture dispersion of the two solutions is monitored (measured), and that the phase ratio of the mixture dispersion is controlled on the basis of the viscosity change. Specifically, we, the present inventors have found through our investigations that the viscosity of the mixture dispersion varies to increase when the phase thereof is transformed from a (W/O) dispersed phase into an (O/W) dispersed phase through phase transition.

Based on the thus-monitored viscosity change of the mixture dispersion, the condition for washing the polymer solution with an aqueous washing solution is so controlled that the mixture dispersion of the two solutions may have essentially a (W/O) dispersed phase of high washing efficiency and that the blend ratio of the aqueous washing solution in the mixture dispersion is as high as possible. Specifically, the viscosity of the mixture dispersion that approaches the phase ratio condition for ensuring such a (W/O) dispersed phase is continuously monitored, and, based on the thus-monitored viscosity data, the blend ratio of the aqueous washing solution in the mixture dispersion is continuously or stepwise increased to thereby increase the aqueous phase ratio in the thus-controlled mixture dispersion. As a result, after the aqueous phase ratio in the mixture dispersion has increased, the (W/O) dispersed phase of the mixture dispersion will soon change to an (O/W) dispersed phase through phase transition in the mixture dispersion.

Through the phase transition thus having occurred in the mixture dispersion, the viscosity of the mixture dispersion increases. Before this stage, the viscosity increase is monitored, and the flow rate of the aqueous washing solution to be introduced into the system is decreased to retard the phase transition. Even though the phase transition has occurred therein, the mixture dispersion can be immediately restored to its original condition of the (W/O) dispersed phase. Accordingly, even though the phase ratio in the dispersion mixture that may undergo the phase transition varies in time owing to the change of the properties of the impurities-containing polycarbonate/organic solvent solution and the aqueous washing solution, the phase transition in the dispersion mixture can be surely detected by monitoring the viscosity change of the mixture dispersion.

Another characteristic feature of the invention is that various means, for example, a viscometer can be employed for monitoring (measuring) the viscosity of the mixture dispersion. The viscometer includes an oscillational viscometer, a rotary viscometer, an orifice viscometer, etc. Of those, preferred for use in the invention is an (ultrasonic) oscillational viscometer. This is because the viscosity of the mixture dispersion must be measured while the mixture dispersion keeps its dispersed condition.

In this point, other types of viscometers are unfavorable. For example, when an orifice viscometer is used for the measurement, the dispersion mixture will undergo phase inversion while it passes through the orifice of the viscometer. When a torsional torque viscometer is used for the on-line measurement, it is influenced by the flow rate of the dispersion mixture, and if the flow rate thereof is lowered, the mixture dispersion undergoes phase inversion. The oscillational viscometer may be disposed in the main line or in the by-pass line after the mixing and dispersing unit in a continuous washing line where a polymer solution is washed according to the method of the invention. Examples of the oscillational viscometer are Viscomate FVM-809A, VM-100A and VM-1G (all Yamaichi Electric's oscillational viscometers), FUV-1 (Fuji Industry's ultrasonic oscillational viscometer), etc. The viscosity range capable of being measured with those oscillational viscometers falls generally between 10 and 5000 mPa.s or so.

In the invention, the mixture dispersion thus having been washed in the condition of good washing efficiency is then led into a separation unit, in which it is separated into a purified polycarbonate/organic solvent solution and the aqueous washing solution (waste water). The separation unit is not specifically defined. For example, it may be for static separation, filter separation, centrifugal separation, or coalescence. In the separation step, many impurities are in the aqueous washing solution. Therefore, the separation unit to be employed in the step is preferably such that the water content of the polycarbonate/organic solvent solution having been separated from the mixture dispersion therein is reduced as much as possible.

Also in the separation step, preferred is centrifugal separation in view of the equipment for it, the separation time, the processability and the continuous operability. For such centrifugal separation, preferred is a device capable of separating water from thick oily emulsion to a degree of water saturation of the emulsion through high-performance centrifugal force of at least 300 G, more preferably at least 700 G. Concretely, the centrifugal separator of the type includes K.C.C. Centrifugal Extractor (from Kawasaki Heavy Industries), Hitachi V-ring Centrifugal Extractor (from Hitachi), TA Model Centrifugal Separator (from Westfalia Separator), etc.

One embodiment of the method for washing a polycarbonate/organic solvent solution of the invention is a continuous washing method, and this is described hereinafter with reference to the drawing attached hereto. The drawing illustrates a continuous washing line for the method. In this embodiment, a crude polymer solution is washed continuously with alkali, acid and pure water in that order, and the solution having been washed in each step is centrifuged and then led into the next washing step.

FIG. 1 is a schematic view of the continuous washing process, illustrating one embodiment of the method for washing a polycarbonate/organic solvent solution of the invention. In FIG. 1, 1 indicates a centrifugal separator; 2 indicates a polycarbonate solution; 3 indicates a waste water; 4 indicates an aqueous washing solution; 5 indicates a line mixer; 6 indicates a viscometer; 7 indicates a controller; 8 indicates a valve for controlling the flow rate of the aqueous washing solution; 9 indicates a centrifugal separator; 10 indicates a purified polycarbonate solution; 11 indicates a waste water; 12 indicates a polymerization step; 13 indicates an alkali washing step; 14 indicates an acid washing step; 15 indicates a pure water washing step; 16 indicates a polymer recovery step; 17 indicates a final product.

The reaction mixture from the polymerization step, which comprises an impurities-containing polycarbonate resin/dichloromethane solution and water, is fed into the centrifugal separator 1, in which it is separated into an impurities-containing polycarbonate resin/dichloromethane solution 2 and a waste water 3. To the thus-separated polycarbonate solution 2, added is an aqueous washing solution (aqueous sodium hydroxide solution) 4 via the flow rate control valve 4 in a specific aqueous phase ratio, and the resulting mixture is led into the line mixer 5. The line mixer 5 is equipped with a turbine blade, in which the mixture is forcedly agitated and dispersed with a predetermined stirring power per the unit flow rate (for example, 1 kW/m$^3$/hr or so) applied thereto, and forms a dispersion having a particle size of the liquid drops therein of at most 100 μm. Though this, the polymer solution is washed with the alkali solution.

In this stage, the phase ratio of the aqueous washing solution in the mixture dispersion is so selected that the mixture dispersion may form a (W/O) dispersed phase, and the aqueous washing solution corresponding to it is added to the polymer solution. After the mixture dispersion has gone out of the line mixer, its viscosity is all the time monitored with the (oscillational) viscometer 6. The viscosity data thus monitored are inputted into the controller 7, in which they are compared with a predetermined standard viscosity (for forming the intended (W/O) dispersed phase).

Figure 2:
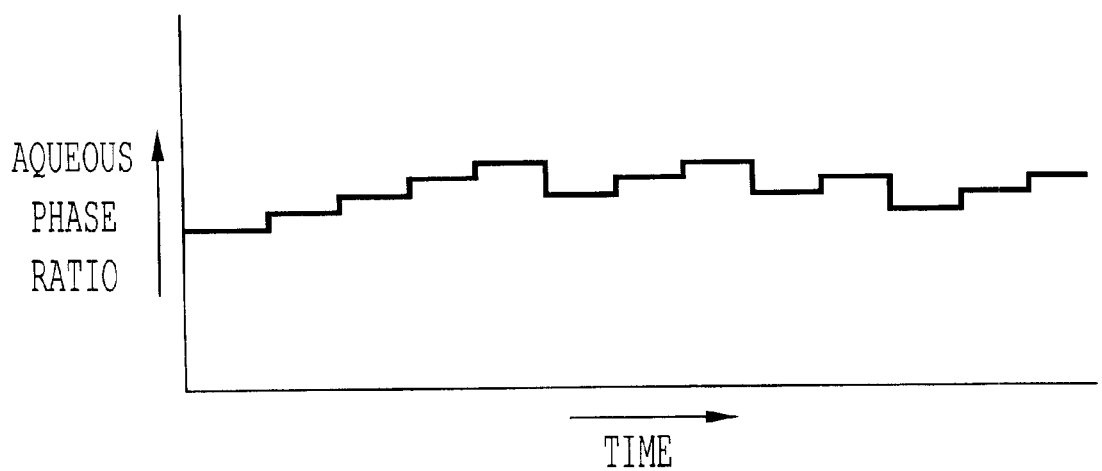
FIG. 2 is an explanatory view showing a controlled flow pattern in the washing method of the invention.

In this stage, in general, the flow rate of the polycarbonate solution from the polymerization step is kept nearly constant. Therefore, the flow rate of the aqueous washing solution to be added to the polymer solution is stepwise increased little by little, for example, as in the pattern of FIG. 2. The increase in the aqueous washing solution in this stage results in the increase in the aqueous phase ratio in the mixture dispersion of the polymer solution and the washing solution, and therefore the efficiency of washing the polymer solution increases as the interfacial area of the two solutions increases. However, after the aqueous phase ratio in the mixture dispersion had reached a certain level, the mixture dispersion undergoes phase transition. The viscosity change of the mixture dispersion is all the time inputted into the controller. Therefore, depending on the viscosity change, the flow rate of the aqueous washing solution is lowered, as in FIG. 2. As a result, the viscosity of the mixture dispersion is restored to the original good condition, and the mixture dispersion forms the stable (W/O) dispersed phase. In FIG. 2, 18 indicates the aqueous phase ratio in the mixture dispersion; and 19 indicates time.

Thus controlled, the aqueous phase ratio in the mixture dispersion is prevented from fluctuating too much, and is kept high, therefore enabling high-efficiency washing of the polymer solution. The stable level of the aqueous phase ratio varies, depending on the properties of the polycarbonate solution. However, the variation is followed by the viscosity change of the mixture dispersion. Therefore, in the method of the invention, the aqueous phase ratio can be kept all the time at a higher level to realize the favorable washing condition for higher washing efficiency, than in a conventional washing process in which the polymer solution being processed is sampled for intermittently monitoring it. In addition, the method of the invention may be effected in an automatic line.

The above description is for the first step of washing the polymer solution with an alkali. This may apply to the other acid washing step and the pure water washing step, and even to any other additional washing steps. In each washing step, the properties of the polycarbonate solution and those of the aqueous washing solution vary, and the phase inversion condition shall vary depending on the stirring power applied to the mixing unit and on the size of the liquid drops in the mixture dispersion of the two solutions. Accordingly, even if the aqueous phase ratio in the mixture dispersion is the same in every step, the viscosity of the mixture dispersion shall naturally vary to a great extent in each step. In every step, however, there is no difference in the viscosity change of the mixture dispersion that depends on the phase transition thereof. Therefore, in every step, the optimization of the washing condition is realized in the same manner as herein.

The polycarbonate solution thus having been purified through the washing steps and having been finally separated is recovered in any ordinary manner of polymer recovery. For example, while stirred, the solution is heated, concentrated and crystallized into flakes; or it is flaked with a bad solvent, or is flaked with steam. Next, the resulting polymer flakes are pelletized generally through an extruder (vented), and high-quality polymer pellets are thus obtained.

As so described in detail hereinbefore, the apparatus for washing a polycarbonate/organic solvent solution of the invention comprises a unit for monitoring the flow rate of the impurities-containing polycarbonate/organic solvent solution to be purified therein, a unit for monitoring the flow rate of the aqueous washing solution to be used therein, a unit for mixing and dispersing the two solutions, a unit for monitoring the viscosity of the mixture dispersion of the two solutions, a unit for controlling the blend ratio of the two solutions on the basis of the relation between the viscosity and the phase condition of the mixture dispersion, and a unit for separating the mixture dispersion into a purified polymer solution and an aqueous waste. In the apparatus, preferably, the mixing and dispersing unit is a line mixer and the separation unit is a centrifugal separator. With those, the apparatus ensures continuous washing of an impurities-containing polycarbonate/organic solvent solution.

The invention is described more concretely with reference to the following Examples, which, however, are not intended to restrict the scope of the invention.

(I) Relation Between the Phase Condition and the Viscosity of Mixture Dispersion in Washing Polymer Solution An emulsion obtained through polycondensation of bisphenol A with phosgene in a mode of interfacial polymerization was centrifuged to prepare an impurities-containing polycarbonate/dichloromethane solution (A). The solution had <1> a remaining bisphenol A content of 32 ppm; <2> a viscosity-average molecular weight of 23,000; <3> a polycarbonate content of 12.5% by weight; and <4> a viscosity of 74 mPa.s (23° C.).

(1) Washing Step with Alkali Water

The dichloromethane solution (A) and an aqueous sodium hydroxide solution (B1) having a pH of 12.5 were fed into a line mixer (having a capacity of 0.3 liters—in this, the diameter of the first turbine blade is 42.5 mm and that of the second turbine blade is 48 mm), at a flow rate of 38 liters/hr and 9.5 liters/hr, respectively, so as to make the dichloromethane solution phase have a volume of 80% and the aqueous solution phase have a volume of 20%. In this, the two solutions were stirred, mixed and dispersed with a controlled stirring power per the unit flow rate of 0.33 kW/m$^3$/hr being applied thereto. In that manner, the polymer solution was washed with the alkali solution.

Next, the mixture dispersion from the outlet of the line mixer was led into a centrifugal extractor (Kawasaki Heavy Industries' K.C.C. Centrifugal Extractor, having a capacity of 4 liters and a rotor diameter of 430 mm), in which this was subjected to centrifugal extraction at a revolution of 3,000 rpm to obtain a primary-purified polycarbonate/dichloromethane solution (A') at a flow rate of 38 liters/hr.

(2) Washing Step with Acid Water

The primary-purified polycarbonate/dichloromethane solution (A') obtained in (1), and aqueous 0.1 N hydrochloric acid solution (B2) were led into a next line mixer (having a capacity of 1.2 liters—in this, the diameter of the turbine blade is 48 mm), at a flow rate of 38 liters/hr and 9.5 liters/hr, respectively, so as to make the dichloromethane solution phase have a volume of 80% and the aqueous washing solution phase have a volume of 20%. In this, the two solutions were stirred, mixed and dispersed with a controlled stirring power per the unit flow rate of 0.67 kW/m$^3$/hr being applied thereto. In that manner, the polymer solution was washed with the acid solution.

Next, the mixture dispersion from the outlet of the line mixer was led into a centrifugal extractor (Kawasaki Heavy Industries' K.C.C. Centrifugal Extractor, having a capacity of 4 liters and a rotor diameter of 430 mm), in which this was subjected to centrifugal extraction at a revolution of 3,000 rpm to obtain a secondary-purified polycarbonate/dichloromethane solution (A") at a flow rate of 38 liters/hr.

(3) Washing Step with Pure Water

The secondary-purified polycarbonate/dichloromethane solution (A") obtained in (2), and pure water (ion-exchanged water, having a specific electroconductivity of 0.1 μS/cm) (B3) were led into a still next line mixer (having a capacity of 0.3 liters—in this, the diameter of the first turbine blade is 42.5 mm and that of the second turbine blade is 48 mm), at a flow rate of 38 liters/hr and 9.5 liters/hr, respectively, so as to make the dichloromethane solution phase have a volume of 80% and the aqueous washing solution phase have a volume of 20%. In this, the two solutions were stirred and mixed with a controlled stirring power per the unit flow rate of 1.1 kW/m$^3$/hr being applied thereto. In that manner, the polymer solution was washed with the pure water.

Next, the mixture dispersion from the outlet of the line mixer was led into a centrifugal extractor (Kawasaki Heavy Industries' K.C.C. Centrifugal Extractor, having a capacity of 4 liters and a rotor diameter of 430 mm), in which this was subjected to centrifugal extraction at a revolution of 3,000 rpm to obtain a tertiary-purified polycarbonate/dichloromethane solution at a flow rate of 38 liters/hr. Through the process, the polycarbonate/solvent solution was purified.

After the line mixer in every washing step in which the solutions led thereinto were mixed and dispersed, disposed was a shielded oscillational viscometer (Yamaichi Electric's FVM-80A) with which the viscosity of the mixture dispersion from the line mixer was continuously monitored. In the process, the viscometers indicated the following data:

| Step (1) | 160 mPa · s |
| Step (2) | 130 mPa · s |
| Step (3) | 140 mPa · s |

In this stage, the mixture dispersion of the polycarbonate solution and the aqueous washing solution was sampled at the outlet of each line mixer, and the condition of the dispersed phase thereof was macroscopically checked. Every sample was found to form a water-in-oil dispersed phase (W/O), or that is, the aqueous phase was the dispersed phase in every sample. The amount of the impurities having still remained in the purified polycarbonate solution obtained in the washing process was as follows: The sodium ion content was 0.02 ppm, the chloride ion content was 0.03 ppm, and the bisphenol A content was 3.7 ppm, all in the dichloromethane solution. The data confirm the complete purification of the polymer solution.

Next, the flow rate of the aqueous washing solution in every washing step of the process was increased by 20% in two stages (that is, 40% in total of the aqueous phase ratio of 20% by volume), and the viscosity change of the dispersion mixture was monitored in every step. In this stage, the viscometers indicated the following data:

| Step (1) | 650 mPa · s |
| Step (2) | 220 mPa · s |
| Step (3) | 190 mPa · s |

All the viscometers well indicated the viscosity of the dispersion mixture. In addition, the mixture dispersion was simultaneously sampled at the outlet of each line mixer, and the condition of the dispersed phase thereof was macroscopically checked. Every sample was found to form an oil-in-water dispersed phase (O/W). This means that the aqueous phase was transformed into a continuous phase through phase inversion in every sample. The amount of the impurities having still remained in the purified polycarbonate solution obtained in the washing process was as follows: The sodium ion content was 1.8 ppm, the chloride ion content was 2.1 ppm, and the bisphenol A content was 12 ppm, all in the dichloromethane solution. The data indicate that the purity of the polymer solution purified in the process is low.

Accordingly, it is obvious that the phase transition of the mixture dispersion can be confirmed by monitoring the increase in the viscosity thereof and that the mixture dispersion can be kept having a W/O dispersed phase favorable for washing it by controlling the flow rate of the washing water to the viscosity level before the phase transition.

(II) Continuous Washing

In the washing process demonstrated above, the flow rate of the aqueous washing solution to be applied to the system in every step is stepwise increased, for example, by 10% (based on the original flow rate of the aqueous washing solution), based on the pattern shown in FIG. 2. In that manner, it is possible to continuously wash the polymer solution in the process. The viscosity of the mixture dispersion in the process is continuously monitored, and when it has increased, the flow rate of the aqueous washing solution to be applied to the system in every step is automatically decreased, for example, by 20% and the system is then driven for a few minutes. In the process having such a modified sequence of washing steps, it is also possible to continuously wash the polymer solution. Specifically, the viscosity level of the mixture dispersion is determined in every washing step, based on the standard viscosity of the mixture dispersion having been predetermined from the correlation between the phase condition of the mixture dispersion and the viscosity thereof, and the mixture dispersion is prevented from undergoing phase transition into the (O/W) dispersed phase or the term for the phase transition of the mixture dispersion is shortened. In that manner, the mixture dispersion can keep essentially the (W/O) dispersed phase of good washability, and, in addition, it can be continuously washed while having a relatively high-level aqueous phase ratio therein.

INDUSTRIAL APPLICABILITY

According to the method of the present invention for washing an impurities-containing polycarbonate/organic solvent solution with an aqueous washing solution, it is possible to surely control the mixture dispersion of the two solutions so that the mixture dispersion can all the time have a water-in-oil dispersed phase of good washability, and the amount of the washing solution to be used maybe relatively small. In the method, in addition, since the phase ratio of the aqueous washing solution in the mixture dispersion can be automatically controlled at a high level, the washing efficiency is much improved, and the method saves energy and resources. Accordingly, in the invention, the washing costs can be reduced and the quality of the washed polycarbonate is improved.

What is claimed is:

1. A method for washing an impurities-containing polycarbonate/organic solvent solution with an aqueous washing solution, which comprises:

mixing and dispersing the polycarbonate/organic solvent solution with an aqueous washing solution which establishes a water-in-oil or oil-in-water phase dispersion of the two solutions;

monitoring the viscosity of the resulting dispersion;

confirming the particular phase of the dispersion by any change in viscosity of the dispersion as the viscosity of the dispersion is monitored; and controlling the ratio of the blended amounts of the aqueous washing solution to the polycarbonate/organic solvent solution on the basis of the determined viscosity of the dispersion of the two solutions which indicates its phase.

2. The method as claimed in claim 1, wherein the blending of the polycarbonate/organic solvent solution and the aqueous washing solution is so controlled that the dispersion forms essentially a water-in-oil dispersed phase.

3. The method as claimed in claim 1, wherein the ratio of the aqueous washing solution to the polycarbonate/organic solvent solution blend is automatically controlled.

4. The method as claimed in claim 1, wherein the polycarbonate content of the impurities-containing polycarbonate/organic solvent solution ranges from 5 to 30% by weight, and the fraction of the aqueous phase in the dispersion of the polycarbonate/organic solvent solution and the aqueous washing solution ranges from 10 to 40% by volume.

5. The method as claimed in claim 1, wherein the viscosity of the dispersion of the polycarbonate/organic solvent solution and the aqueous washing solution is monitored with an oscillational viscometer.

6. The method as claimed in claim 1, wherein the dispersion of the polycarbonate/organic solvent solution and the aqueous washing solution is formed in a line mixer.

7. The method as claimed in claim 6, wherein the stirring power in the line mixer is at least 0.1 kW/m$^3$/hr for the unit flow rate therein.

8. The method as claimed in claim 1, wherein a purified polycarbonate/organic solvent solution is separated from the dispersion of the polycarbonate/organic solvent solution and the aqueous washing solution which has been mixed in a controlled blend ratio of the liquid components.

9. The method as claimed in claim 1, wherein the polycarbonate is obtained by interfacial polymerization of a dihydroxy compound with phosgene in the presence of an organic solvent.

10. The method as claimed in claim 9, wherein the dihydroxy compound is a bis(hydroxyphenyl)alkane, a 4,4'-dihydroxydiphenyl, a bis(4-hydroxyphenyl)alkane, a bis(4-hydroxyphenyl) oxide, a bis(4-hydroxyphenyl)sulfide, a bis (4-hydroxyphenyl)sulfone, a bis(4-hydroxyphenyl) sulfoxide, a bis(4-hydroxyphenyl)ether, a bis(4-hydroxyphenyl)ketone, a hydroquinone, resorcin or a catechol.

11. The method as claimed in claim 10, wherein the polycarbonate content of the polycarbonate/organic solvent solution ranges from 6 to 25% by wt.

12. The method as claimed in claim 9, wherein the organic solvent of the polycarbonate/organic solvent solution is an aliphatic chlorohydrocarbon, an aromatic chlorohydrocarbon or a mixture of a chlorohydrocarbon with dioxane, tetrahydrofuran, acetophenone an aromatic hydrocarbon or an aliphatic hydrocarbon.

13. The method as claimed in claim 1, wherein the polycarbonate content of the polycarbonate/organic solvent solution ranges from 5 to 30% by wt.

14. The method as claimed in claim 1, wherein the aqueous washing solution is an aqueous alkali solution or an diluted aqueous acid solution.

15. The method as claimed in claim 1, wherein the amount of aqueous washing solution ranges from 5 to 50% by volume relative to the total amount (100%) of the polycarbonate/organic solvent solution and the aqueous washing solution.

16. The method as claimed in claim 15, wherein the amount of aqueous washing solution ranges from 10 to 40% by volume.

* * * * *

UNITED STATES PATENT AND TRADEMARK OFFICE
CERTIFICATE OF CORRECTION

PATENT NO. : 6,605,221 B2  Page 1 of 1
APPLICATION NO. : 09/926721
DATED : August 12, 2003
INVENTOR(S) : Kunishi et al.

It is certified that error appears in the above-identified patent and that said Letters Patent is hereby corrected as shown below:

On the title page, Item (30), the Foreign Application Priority Data has been omitted. Item (30) should read:

-- (30)        Foreign Application Priority Data

Apr. 10, 2000  (JP) ………………………….. 2000-107417 --

Signed and Sealed this

Twenty-first Day of November, 2006

JON W. DUDAS
*Director of the United States Patent and Trademark Office*